(12) United States Patent
Lee et al.

(10) Patent No.: US 12,276,221 B2
(45) Date of Patent: Apr. 15, 2025

(54) CATALYTIC CONVERTER OF VEHICLE

(71) Applicants: Hyundai Motor Company, Seoul (KR); Kia Corporation, Seoul (KR); Faurecia, Korea, Ltd., Yongin-si (KR)

(72) Inventors: Sangmin Lee, Suwon-Si (KR); Inkyun Na, Hwaseong-Si (KR); Gyuhwa Jeong, Suwon-Si (KR); Dongjun Lee, Ansan-Si (KR)

(73) Assignees: Hyundai Motor Company, Seoul (KR); Kia Corporation, Seoul (KR); Faurecia, Korea, Ltd., Yongin-si (KR)

( * ) Notice: Subject to any disclaimer, the term of this patent is extended or adjusted under 35 U.S.C. 154(b) by 185 days.

(21) Appl. No.: 17/977,479

(22) Filed: Oct. 31, 2022

(65) Prior Publication Data

US 2024/0035406 A1    Feb. 1, 2024

(30) Foreign Application Priority Data

Jul. 27, 2022    (KR) .......................... 10-2022-0092986

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01D 53/9422* (2013.01);
(Continued)

(58) Field of Classification Search
CPC ...... F01N 3/035; F01N 3/0807; F01N 3/0814; F01N 3/0821; F01N 3/0842;
(Continued)

(56) References Cited

U.S. PATENT DOCUMENTS 10,934,918 B1 *   3/2021   Goffe ................. B01D 53/9427
2011/0011067 A1 *  1/2011   Ren ..................... B01D 46/2418
                                                                    60/297

(Continued)

FOREIGN PATENT DOCUMENTS

| EP | 2659101 B1 | 2/2014 |
|---|---|---|
| JP | 6125248 B2 | 5/2017 |

(Continued)

*Primary Examiner* — Binh Q Tran
(74) *Attorney, Agent, or Firm* — Morgan, Lewis & Bockius LLP

(57) ABSTRACT

The catalytic converter of the vehicle includes: an LNT converter including an LNT catalyst to reduce nitrogen oxides; an SDPF converter including an SDPF catalyst to capture particulate matters and reduce the nitrogen oxides; a connection housing connecting the LNT converter and the SDPF converter to each other; an injection module provided in the connection housing to inject the reducing agent from the LNT converter toward the SDPF converter; an impactor atomizing and vaporizing the reducing agent injected from the injection module; a first guide mixer provided inside the connection housing to form a swirl-direction flow of the exhaust gas mixed with the reducing agent atomized through the impactor; and a second guide mixer provided downstream of the first guide mixer inside the connection housing to form an additional swirl-direction flow of the exhaust gas mixed with the reducing agent.

12 Claims, 17 Drawing Sheets

(51) Int. Cl.
*F01N 3/035* (2006.01)
*F01N 3/08* (2006.01)
*F01N 3/10* (2006.01)
*F01N 3/28* (2006.01)
*F01N 13/00* (2010.01)
*F01N 13/18* (2010.01)

(52) U.S. Cl.
CPC ..... *B01D 53/9431* (2013.01); *B01D 53/9477* (2013.01); *F01N 3/035* (2013.01); *F01N 3/105* (2013.01); *F01N 3/2892* (2013.01); *F01N 13/009* (2014.06); *F01N 13/1805* (2013.01); *B01D 2255/904* (2013.01); *B01D 2255/915* (2013.01); *F01N 3/0807* (2013.01); *F01N 3/0814* (2013.01); *F01N 3/0821* (2013.01); *F01N 3/206* (2013.01); *F01N 2330/38* (2013.01); *F01N 2610/02* (2013.01); *F01N 2610/146* (2013.01); *F01N 2900/1812* (2013.01)

(58) Field of Classification Search
CPC ........ F01N 3/0885; F01N 3/105; F01N 3/206; F01N 3/2066; F01N 3/208; F01N 3/2882; F01N 3/2892; F01N 13/009; F01N 13/1805; F01N 2230/38; F01N 2240/20; F01N 2250/02; F01N 2570/14; F01N 2610/02; F01N 2610/1446; F01N 2610/146; F01N 2610/1453; F01N 2900/1811; F01N 2900/1812; F01N 2900/1818; F01N 2900/1821; F01N 2330/38; B01D 47/025; B01D 53/9418; B01D 53/9422; B01D 53/9431; B01D 53/9477; B01D 2255/904; B01D 2255/915; B01D 53/9495; B01D 2257/404; B01D 2257/502; B01D 2257/702; B01D 2321/2016

See application file for complete search history.

(56) References Cited

U.S. PATENT DOCUMENTS

| | | | |
|---|---|---|---|
| 2014/0033686 A1 | 2/2014 | Fischer et al. | |
| 2015/0308316 A1* | 10/2015 | Li | F01N 3/2892 60/295 |
| 2017/0081999 A1* | 3/2017 | Lee | F01N 3/035 |
| 2017/0152778 A1* | 6/2017 | Li | F01N 3/0842 |
| 2017/0292430 A1* | 10/2017 | Clayton, Jr. | B01D 53/9495 |
| 2019/0063292 A1* | 2/2019 | Ciaravino | F01N 3/106 |
| 2022/0364488 A1* | 11/2022 | Stoltz | F01N 3/208 |

FOREIGN PATENT DOCUMENTS

| | | |
|---|---|---|
| KR | 10-1498182 B1 | 3/2015 |
| KR | 10-1758220 B1 | 7/2017 |
| KR | 10-2114909 B1 | 5/2020 |

\* cited by examiner

CATALYTIC CONVERTER OF VEHICLE

CROSS-REFERENCE TO RELATED APPLICATION

The present application claims priority to Korean Patent Application No. 10-2022-0092986 filed on Jul. 27, 2022, the entire contents of which is incorporated herein for all purposes by this reference.

BACKGROUND OF THE PRESENT DISCLOSURE

Field of the Present Disclosure

The present disclosure relates to a catalytic converter of a vehicle. More particularly, the present disclosure relates to a catalytic converter of a vehicle configured for improving a flow uniformity of a reducing agent.

Description of Related Art

In general, exhaust gas discharged through an exhaust manifold from an engine is guided into a catalytic converter provided in an exhaust pipe for purification, and the purified exhaust gas is discharged into the atmosphere through a tail pipe after noise is attenuated while passing through a muffler. The catalytic converter purifies pollutants contained in the exhaust gas. Furthermore, a soot filter for capturing particulate matters (PM) contained in the exhaust gas is mounted on the exhaust pipe.

A denitrification catalyst (DeNOx catalyst) is a type of catalytic converter that purifies nitrogen oxides (NOx) contained in exhaust gas. When a reducing agent such as urea, ammonia, carbon monoxide, or hydrocarbon (HC) is provided to the exhaust gas, the denitrification catalyst reduces nitrogen oxides contained in the exhaust gas through oxidation-reduction reaction with the reducing agent.

Recently, a lean NOx trap (LNT) has been used as a denitrification catalyst. The LNT absorbs nitrogen oxides contained in the exhaust gas when the engine is operated in an atmosphere where an air-fuel ratio is lean, and desorbs the adsorbed nitrogen oxides when the engine is operated in an atmosphere where an air-fuel ratio is rich and reduces the desorbed nitrogen oxides and the nitrogen oxides contained in the exhaust gas.

However, the LNT has a problem that it is not capable of purifying the nitrogen oxides contained in the exhaust gas when the exhaust gas has a high temperature (e.g., when temperature of the exhaust gas is higher than 400 E). When a soot filter for capturing particulate matters (PM) contained in exhaust gas is recycled or when sulfur is removed from the LNT poisoned with the sulfur, the temperature of the exhaust gas becomes very high. As a result, the nitrogen oxides contained in the exhaust gas may be discharged to the outside of the vehicle in a non-purified state.

Recently, as regulations for emission of exhaust gas have become strict in most countries, a DeNOx catalyst (e.g., a composite catalyst unit (SDPF: Selective Catalytic Reduction (SCR) on Diesel Particulate Filters (DPF)) is separately used together with the LNT.

In an SCR catalyst system, a flow uniformity index is very important when ammonia gas vaporized from a reducing agent (e.g., urea solution) is introduced into a front stage of the SCR catalyst. When the flow uniformity index is high, an amount of ammonia absorbed into the SCR catalyst is large, which greatly influences nitrogen oxide purification performance. Here, the flow uniformity index refers to a concentration distribution of ammonia gas.

In an SDPF catalyst system mounted directly on the engine, where an SCR catalyst and a DPF are integrated, because an internal space of an engine compartment is narrow, a space for mixing ammonia is designed in a very limited manner. It is necessary to secure a flow uniformity index of ammonia, while utilizing a narrow mixing space, to satisfy the strict regulations for emission of exhaust gas.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a catalytic converter of a vehicle having an advantage of improving a flow uniformity index of an SDPF catalyst system.

Various aspects of the present disclosure are directed to providing a catalytic converter of a vehicle including: an LNT converter including an LNT catalyst to reduce nitrogen oxides contained in exhaust gas of the vehicle; an SDPF converter including an SDPF catalyst to capture particulate matters contained in the exhaust gas and reduce the nitrogen oxides contained in the exhaust gas using a reducing agent; a connection housing connecting the LNT converter and the SDPF converter to each other; an injection module provided in the connection housing to inject the reducing agent from the LNT converter toward the SDPF converter; an impactor provided inside the connection housing to atomize and vaporize the reducing agent injected from the injection module; a first guide mixer provided inside the connection housing to form a swirl-direction flow of the exhaust gas mixed with the reducing agent atomized through the impactor; and a second guide mixer provided downstream of the first guide mixer inside the connection housing to form an additional swirl-direction flow of the exhaust gas mixed with the reducing agent.

The first guide mixer may include: a first guide body portion extending in a direction from the SDPF converter toward the LNT converter; a first guide left extension portion extending along a first-side internal circumference of an upper portion of the LNT converter from a first end portion of the first guide body portion; and a first guide right extension portion extending along a second-side internal circumference of the upper portion of the LNT converter from a second end portion of the first guide body portion.

The first guide body portion may be concavely formed downward from the upper portion of the LNT converter.

The first guide left extension portion and the first guide right extension portion may be concavely formed to cover an edge portion of the LNT catalyst of the LNT converter.

A distance between an upper surface of the LNT catalyst of the LNT converter and a lowermost end portion of the first guide mixer may be 50% or more than 50% of a diameter of the LNT catalyst of the LNT converter.

The injection module may be mounted on the connection housing to inject the reducing agent in three directions toward the SDPF converter from the LNT converter.

The impactor may include: a first impactor disposed downstream of the first guide mixer to atomize and vaporize the reducing agent injected in two directions from the injection module among the three directions; and a second impactor disposed downstream of the first impactor to atomize and vaporize the reducing agent injected in one direction from the injection module among the three directions.

The first impactor may include: a first fixing portion fixed to a lower surface of the connection housing above the LNT converter; a first left wall formed from the first fixing portion so that the reducing agent injected in one direction from the injection module collides therewith; and a first right wall formed from the first fixing portion so that the reducing agent injected in another direction from the injection module collides therewith.

The second impactor may include a second central wall with which the reducing agent injected in another direction from the injection module collides.

A pair of second central bent portions bent left and right, respectively, may be formed from the second central wall.

Each of the pair of second central bent portions may have a protrusion, and the protrusion may be inserted into a slot formed in the first guide mixer.

The second guide mixer may be formed to extend by a set length along a circumference of the SDPF converter between the SDPF converter and the connection housing.

According to various exemplary embodiments of the present disclosure, the catalytic converter of the vehicle is configured for forming a strong swirl-direction flow of the exhaust gas mixed with the reducing agent using the first guide mixer and the second guide mixer.

The strong swirl-direction flow of the exhaust gas mixed with the reducing agent makes it possible to increase a flow uniformity index of the vaporized reducing agent, increasing an amount of ammonia absorbed into the SDPF catalyst and improving efficiency in purifying nitrogen oxides.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
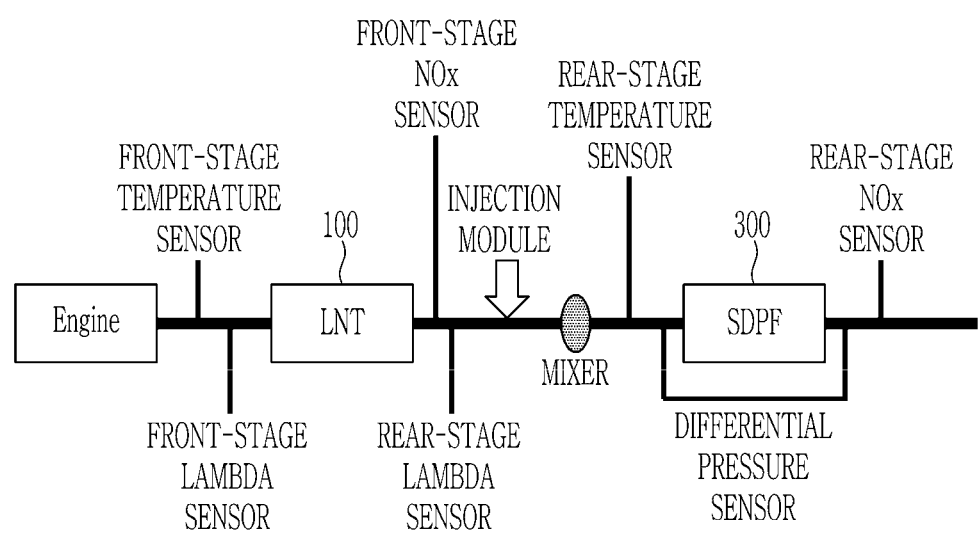
FIG. 1 is a block diagram illustrating a configuration of a catalytic converter of a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will be described in detail, with reference to the accompanying drawings, to be easily conducted by those having ordinary knowledge in the art to which an exemplary embodiment of the present disclosure pertains. However, the present disclosure may be implemented in various different forms and is not limited to the exemplary embodiment described herein.

To clearly explain an exemplary embodiment of the present disclosure, parts irrelevant to the description will be omitted, and the same or similar components will be denoted by the same reference numerals throughout the specification.

Furthermore, the size and thickness of each component illustrated in the drawings are arbitrary for convenience of description, and the present disclosure is not necessarily limited to what is illustrated in the drawings. To clearly express several parts and areas, their thicknesses are enlarged.

Hereinafter, a catalytic converter of a vehicle according to various exemplary embodiments of the present disclosure will be described in detail with reference to the accompanying drawings.

Figure 2:
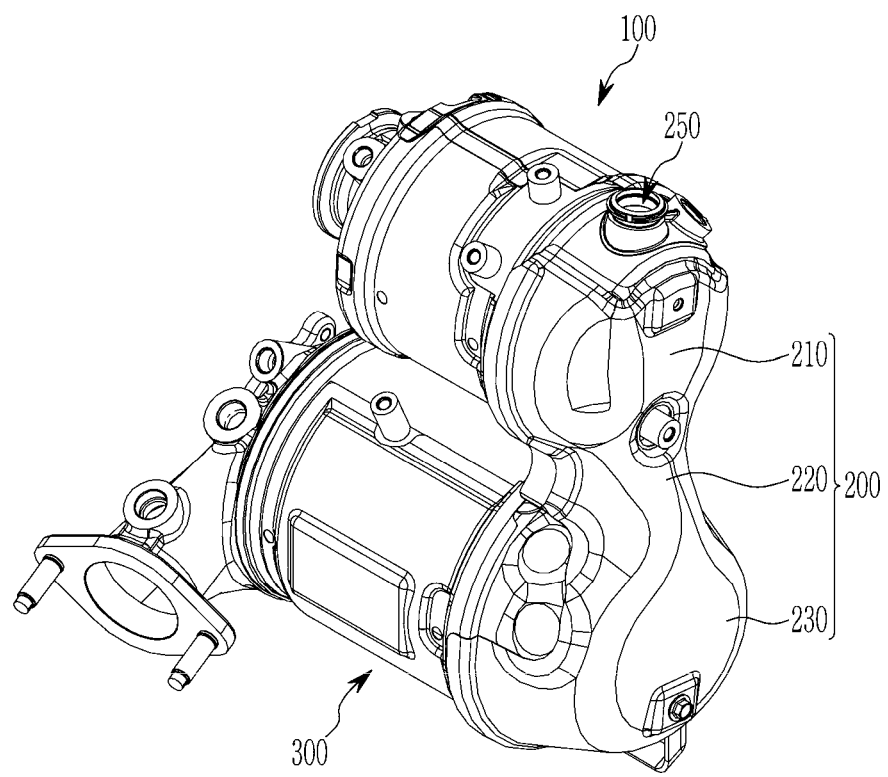
FIG. 2 is a perspective view exemplarily illustrating a configuration of the catalytic converter of the vehicle according to the exemplary embodiment of the present disclosure.

FIG. 1 is a block diagram illustrating a configuration of a catalytic converter of a vehicle according to various exemplary embodiments of the present disclosure. FIG. 2 is a perspective view exemplarily illustrating a configuration of the catalytic converter of the vehicle according to the exemplary embodiment of the present disclosure. Furthermore, FIG. 3 is an exploded perspective view exemplarily illustrating the catalytic converter of the vehicle according to the exemplary embodiment of the present disclosure.

Figure 3:
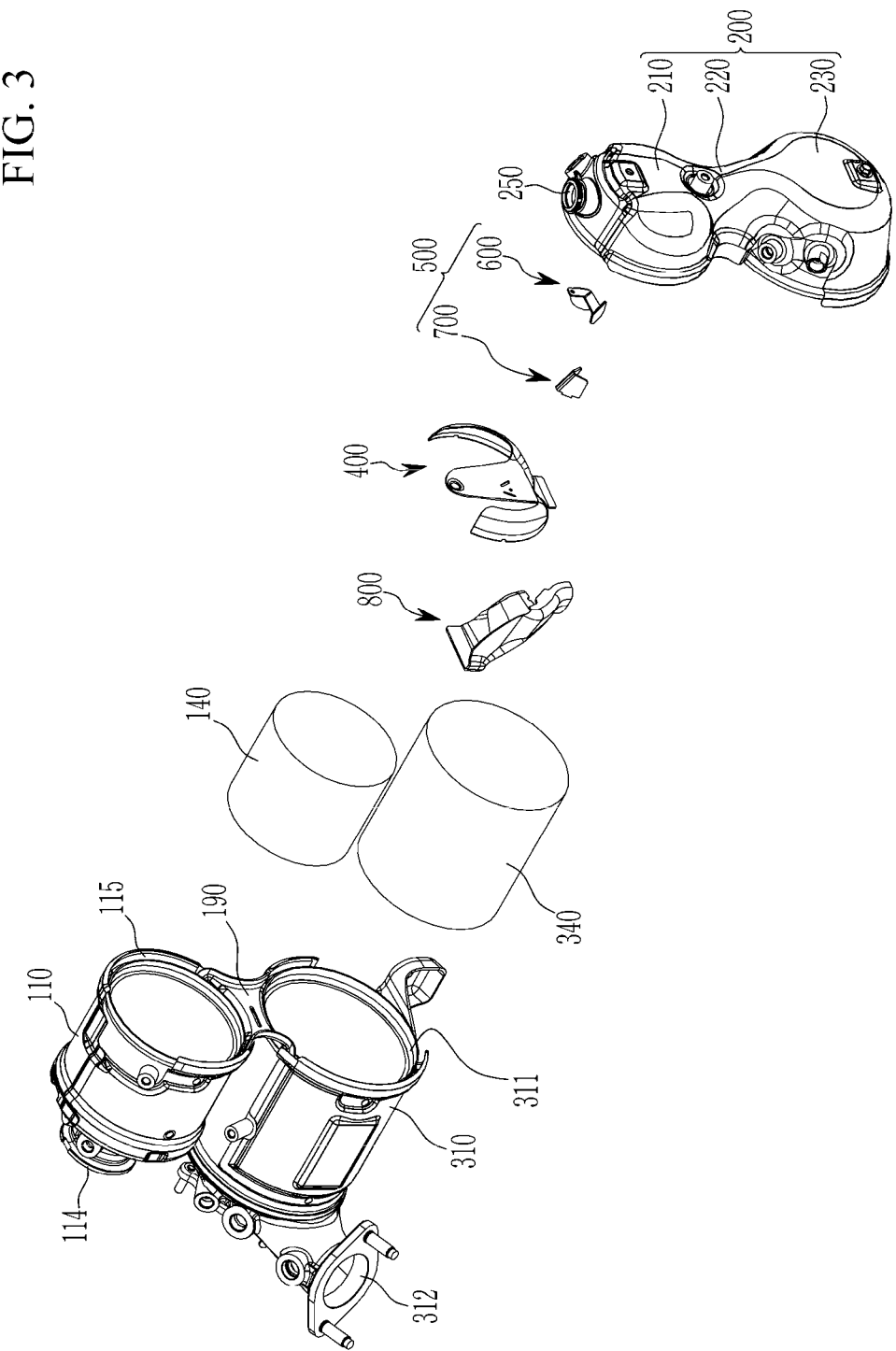
FIG. 3 is an exploded perspective view exemplarily illustrating the catalytic converter of the vehicle according to the exemplary embodiment of the present disclosure.

As illustrated in FIG. 1, FIG. 2, and FIG. 3, the catalytic converter of the vehicle according to the exemplary embodiment of the present disclosure includes an LNT converter 100, an SDPF converter 300, and a connection housing 200 connecting the LNT converter 100 and the SDPF converter 300 to each other.

Exhaust gas introduced into and discharged from the LNT converter 100 flows in a direction from an upper side to a lower side of the LNT converter 100.

The connection housing 200 connects the LNT converter 100 and the SDPF converter 300 to each other, and converts an exhaust gas path so that the exhaust gas discharged from the LNT converter 100 flows to an upper portion of the SDPF converter 300. That is, the exhaust gas inside the connection housing 200 flows in a direction from an upper side to a lower side based on FIG. 2. At the instant time, a reducing agent (e.g., urea) is injected toward the exhaust gas through an injection module 250.

The exhaust gas introduced into the SDPF converter 300 from the connection housing 200 flows from a right side to a left side (based on FIG. 2) inside the SDPF converter 300. That is, the exhaust gas inside the LNT converter 100 flows in an opposite direction to the exhaust gas inside the SDPF converter 300.

Because the exhaust gas inside the LNT converter 100 and the exhaust gas inside the SDPF converter 300 flow in opposite directions as described above, this has an effect in that the LNT converter 100 and the SDPF converter 300 are directly connected to each other, resulting in a minimum thermal loss of exhaust gas.

When the exhaust gas is introduced into the SDPF converter 300 through the connection housing 200 from the LNT converter 100, it is necessary to form a very strong swirl-direction flow of the exhaust gas inside the connection housing 200.

By forming the swirl-direction flow of exhaust gas inside the connection housing 200, there may be an increase in flow uniformity index of ammonia gas introduced into the SDPF converter 300. The increases in flow uniformity index increases an amount of ammonia absorbed into an SDPF catalyst of the SDPF converter 300, and improves nitrogen oxide purification performance.

To the present end, there may be provided, inside the connection housing 200, an impactor including a first impactor 600 and a second impactor 700 that atomize and vaporize the reducing agent injected through the injection module 250, and a first guide mixer 400 and a second guide mixer 800 that mix the reducing agent atomized and vaporized by the impactor and the exhaust gas discharged from the LNT converter 100 and form a swirl-direction flow of the mixture.

Hereinafter, the configurations of the LNT converter 100 and the SDPF converter 300, which form the catalytic converter according to an exemplary embodiment of the present disclosure, will be described in detail.

Referring to FIG. 3, the LNT converter 100 may include an LNT body 110 and an LNT catalyst provided inside the LNT body 110.

An LNT inlet 114 is formed in the LNT body 110 to allow the exhaust gas to be introduced therethrough, and an LNT outlet 115 is formed in the LNT body 110 to allow the exhaust gas introduced from the LNT inlet 114 and passing through the LNT catalyst to be discharged therethrough.

The SDPF converter 300 may include an SDPF body 310 and an SDPF catalyst 340 provided inside the SDPF body 310.

An SDPF inlet 311 and an SDPF outlet 312 are formed in the SDPF body 310, the SDPF inlet 311 allowing the exhaust gas discharged from the LNT converter 100 and the reducing agent injected from the injection module 250 to be introduced therethrough, and the SDPF outlet 312 allowing the exhaust gas introduced from the SDPF inlet 311 and passing through the SDPF catalyst 340 to be discharged therethrough.

The exhaust gas discharged through the SDPF outlet 312 is discharged into the atmosphere through a tail pipe after noise is attenuated while passing through a muffler.

The SDPF catalyst 340 is formed by coating a porous partition wall, which forms a DPF channel, with an SCR catalyst. While the exhaust gas passes through the SDPF catalyst 340, particulate matters contained in the exhaust gas are captured by the SDPF catalyst 340. Furthermore, the coated SCR catalyst in the SDPF catalyst 340 reduces nitrogen oxides contained in the exhaust gas using the reducing agent injected from the injection module 250.

The LNT converter 100 and the SDPF converter 300 may be connected to each other through a connection body 190.

The connection housing 200 may include an LNT cover 210 covering an upper portion of the LNT converter 100, an SDPF cover 230 covering an upper portion of the SDPF converter 300, and a connection cover 220 covering the connection body 190.

A mixing chamber is formed to allow the exhaust gas to move from the LNT converter 100 to the SDPF converter 300 between the LNT converter 100 and the LNT cover 210, between the connection body 190 and the connection cover 220, and between the SDPF converter 300 and the SDPF cover 230.

The injection module 250 may be provided in the LNT cover 210 of the connection housing 200, and the injection module 250 may inject a reducing agent in at least one direction from the LNT cover 210 (or the LNT converter) to the SDPF cover (or the SDPF converter). In various exemplary embodiments of the present disclosure, the injection module 250 may inject a reducing agent in three directions.

In the connection housing 200, a sensor bracket for mounting a front-stage nitrogen oxide sensor and a rear-stage lambda sensor, an injection module bracket for mounting the injection module 250 injecting the reducing agent, a rear-stage temperature sensor bracket for mounting a rear-stage temperature sensor, and a front-stage pressure sensor bracket for mounting a pressure sensor may be formed.

The front-stage nitrogen oxide sensor is configured to detect an amount of nitrogen oxides contained in the exhaust gas having passed through the LNT catalyst 140. The rear-stage lambda sensor is configured to detect a concentration of oxygen contained in the exhaust gas having passed through the LNT catalyst 140. The rear-stage temperature sensor is configured to detect a temperature of the exhaust gas introduced into the SDPF catalyst 340.

Hereinafter, the configurations of the impactor, the first guide mixer 400, and the second guide mixer 800 provided inside the connection housing 200 according to an exemplary embodiment of the present disclosure will be described in detail.

Figure 4:
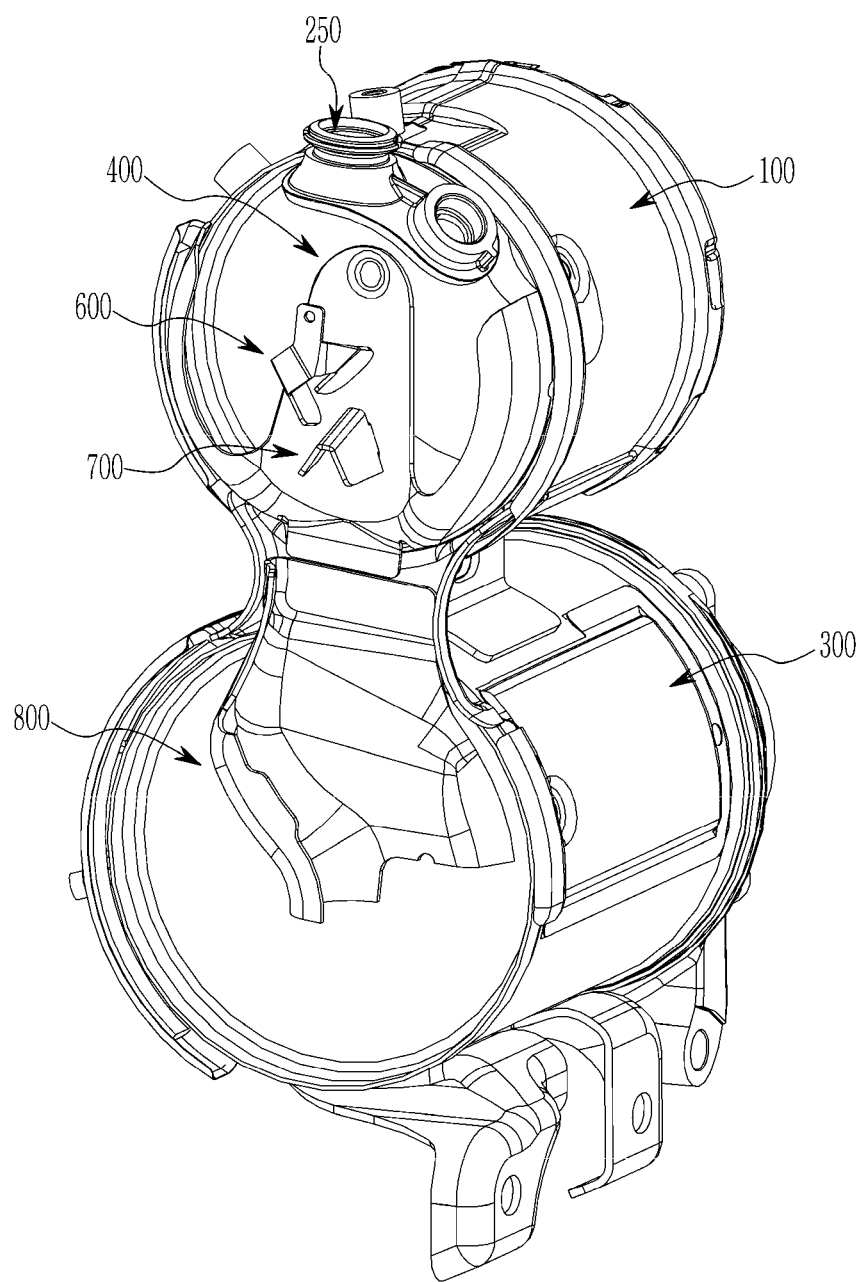
FIG. 4, FIG. 5 and FIG. 6 are partially exploded perspective views exemplarily illustrating the configuration of the catalytic converter of the vehicle according to the exemplary embodiment of the present disclosure.
Figure 5:
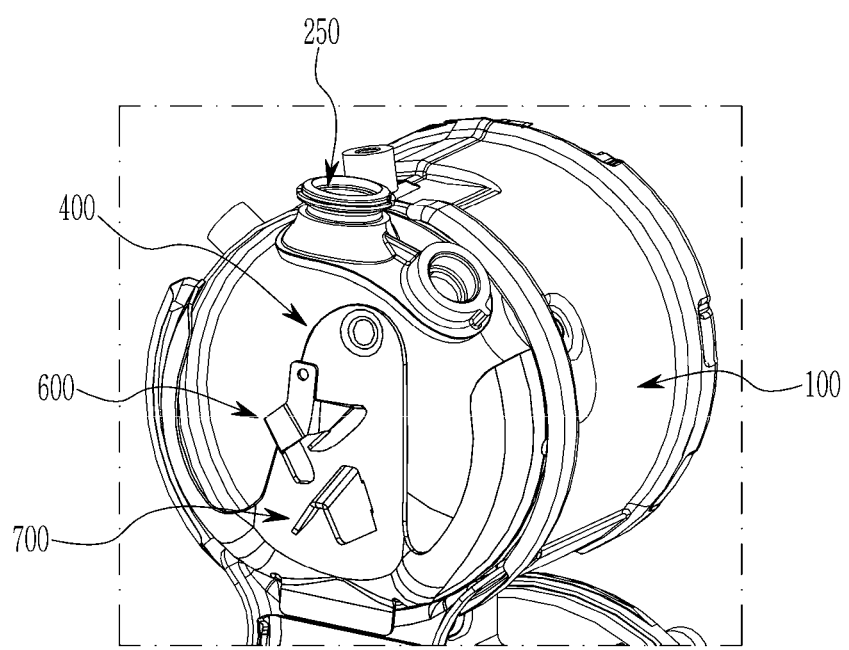
Figure 6:
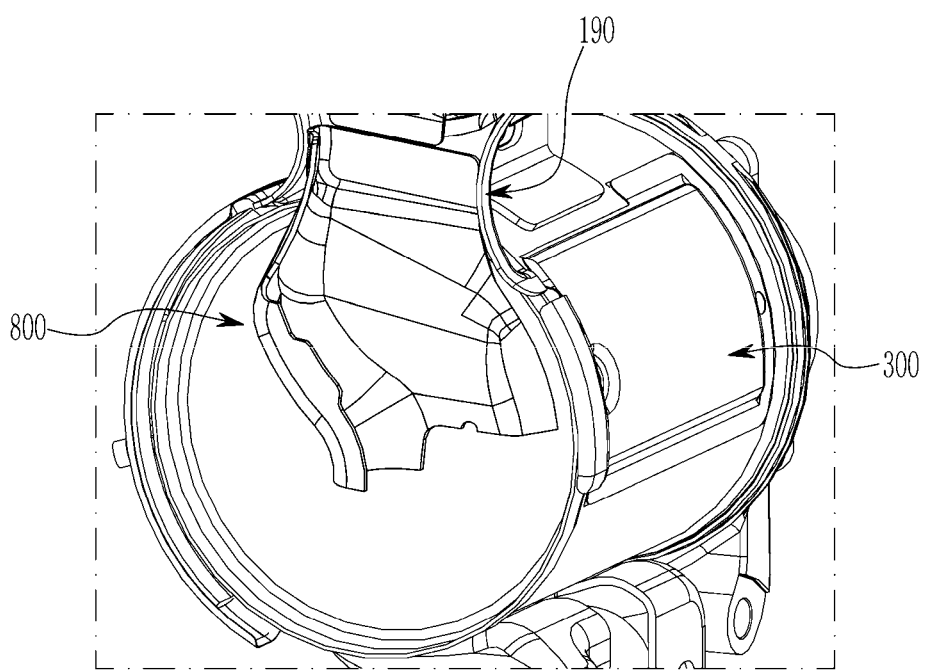

FIG. 4, FIG. 5 and FIG. 6 are partially exploded perspective views exemplarily illustrating the configuration of the catalytic converter of the vehicle according to the exemplary embodiment of the present disclosure.

Referring to FIG. 4, FIG. 5 and FIG. 6, the first guide mixer 400 is disposed on the LNT converter 100, and the first impactor 600 and the second impactor 700 are disposed on the first guide mixer 400. Furthermore, the second guide mixer 800 is disposed on the SDPF converter 300.

<First Guide Mixer 400>

Figure 7:
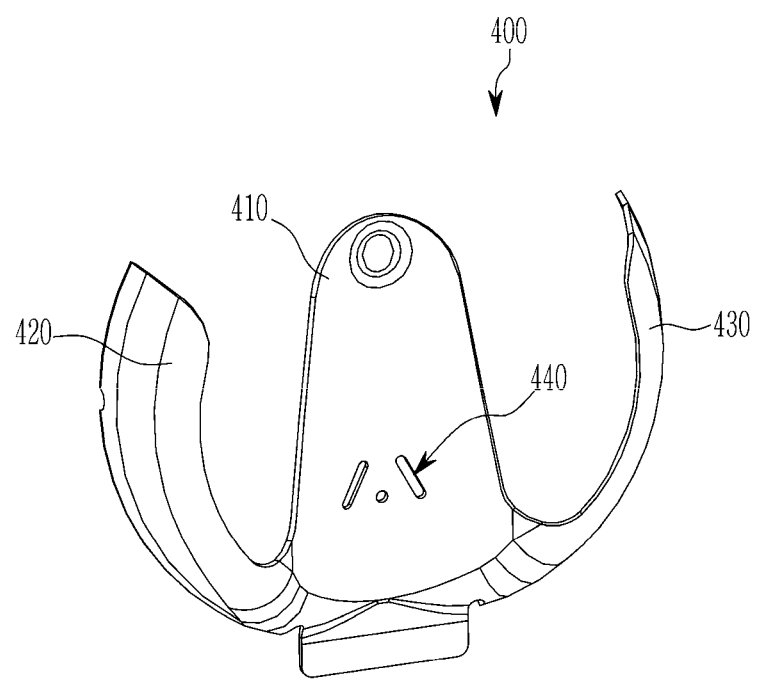
FIG. 7 is a perspective view exemplarily illustrating a configuration of a first guide mixer 400 according to the exemplary embodiment of the present disclosure.

Referring to FIG. 7, the first guide mixer 400 may include a first guide body portion 410 extending in a direction from the connection cover 220 of the connection housing 200 toward the LNT cover 210, a first guide left extension portion 420 extending along a one-side internal circumference of the LNT cover 210 from the connection cover 220, and a first guide right extension portion 430 extending along the other-side internal circumference of the LNT cover 210 from the connection cover 220.

In other words, the first guide mixer 400 may include a first guide body portion 410 extending from the SDPF converter 300 toward the LNT converter 100, a first guide left extension portion 420 extending along one internal side of an upper portion of the LNT converter 100 from one end portion of the first guide body portion 410, and a first guide right extension portion 430 extending along the other internal side of the upper portion of the LNT converter 100 from the other end portion of the first guide body portion 410.

Both sides of the first guide body portion 410 may be concavely formed from the LNT converter 100 toward the LNT cover 210. In other words, the first guide body portion 410 may be concavely formed downward from the upper portion of the LNT converter 100. Furthermore, the first guide left extension portion 420 and the first guide right extension portion 430 may be concavely formed to cover an edge portion of the LNT catalyst of the LNT converter 100.

A pair of slots 440 may be formed in the center portion of the first guide body portion 410 of the first guide mixer 400.

Figure 8:
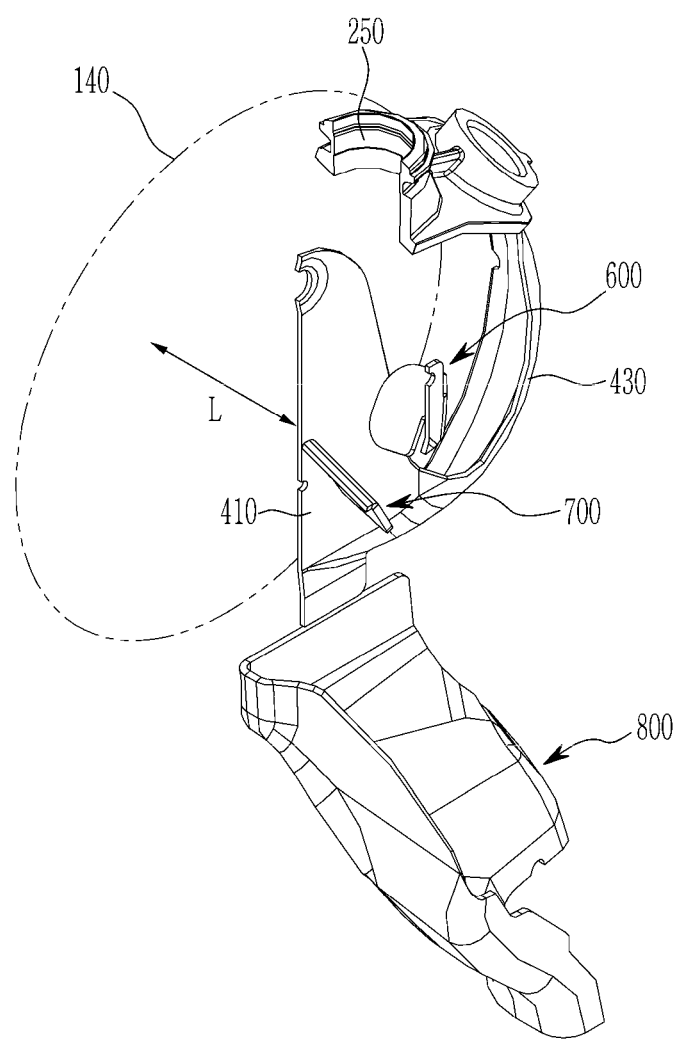
FIG. 8 is a perspective view exemplarily illustrating a partial configuration of the catalytic converter of the vehicle according to the exemplary embodiment of the present disclosure.

If a distance between the LNT catalyst 140 and the first guide mixer 400 is not sufficient, a sufficient swirl-direction flow of the exhaust gas discharged from the LNT catalyst 140 is not formed. Therefore, a distance (L) between an upper surface of the LNT catalyst 140 of the LNT converter 100 and a lowermost end portion of the first guide mixer 400 may be set to 50% or more than 50% of a diameter of the LNT catalyst 140 (see FIG. 8).

<First Impactor 600/Second Impactor 700>

Based on the flow of the exhaust gas, the first impactor 600 is disposed downstream of the first guide mixer 400. The first impactor 600 may be mounted on a lower surface of the LNT cover 210 of the connection housing 200 to atomize and vaporize the reducing agent injected in two directions from the injection module 250.

Based on the flow of the exhaust gas, the second impactor 700 is disposed downstream of the first impactor 600, and may be mounted on the first guide body portion 410 of the first guide mixer 400 to atomize and vaporize the reducing agent injected in one direction from the injection module 250.

Figure 9:
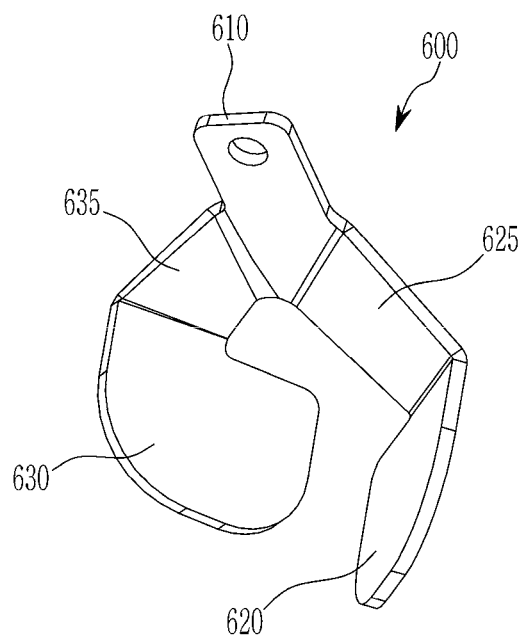
FIG. 9 is a perspective view exemplarily illustrating a configuration of a first impactor 600 according to the exemplary embodiment of the present disclosure.

Referring to FIG. 9, the first impactor 600 may include a first fixing portion 610 fixed to the lower surface of the LNT cover 210 of the connection housing 200 (or a lower surface of the connection housing above the LNT converter), a first left wall 620 formed from the first fixing portion 610 so that the reducing agent injected in one direction from the injection module 250 collides therewith, and a first right wall 630 formed from the first fixing portion 610 so that the reducing agent injected in another direction from the injection module 250 collides therewith.

In various exemplary embodiments of the present disclosure, the first left wall 620 may be connected to the first fixing portion 610 through a first left intermediate wall 625 formed from the first fixing portion 610, and the first right wall 630 may be connected to the first fixing portion 610 through a first right intermediate wall 635 formed from the first fixing portion 610.

Figure 10:
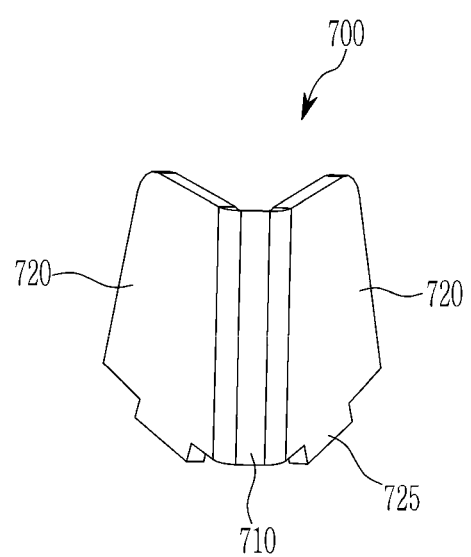
FIG. 10 is a perspective view exemplarily illustrating a configuration of a second impactor 700 according to the exemplary embodiment of the present disclosure.

Referring to FIG. 10, the second impactor 700 is mounted on the first guide mixer 400, and may include a second central wall 710 with which the reducing agent injected in another direction from the injection module 250 collides, and a pair of second central bent portions 720 bent left and right, respectively, from the second central wall 710.

Each of the second central bent portions 720 may have a protrusion 725 at a lower end portion thereof, and the protrusion 725 may be inserted into each of the slots 440 of the first guide mixer 400 so that the second impactor 700 is mounted on the first guide mixer 400.

<Second Guide Mixer 800>

Figure 11:
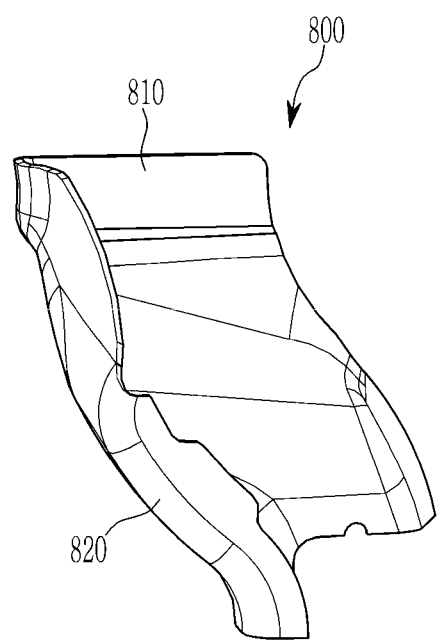
FIG. 11 and FIG. 12 are perspective views exemplarily illustrating a configuration of a second guide mixer 800 according to the exemplary embodiment of the present disclosure.
Figure 12:
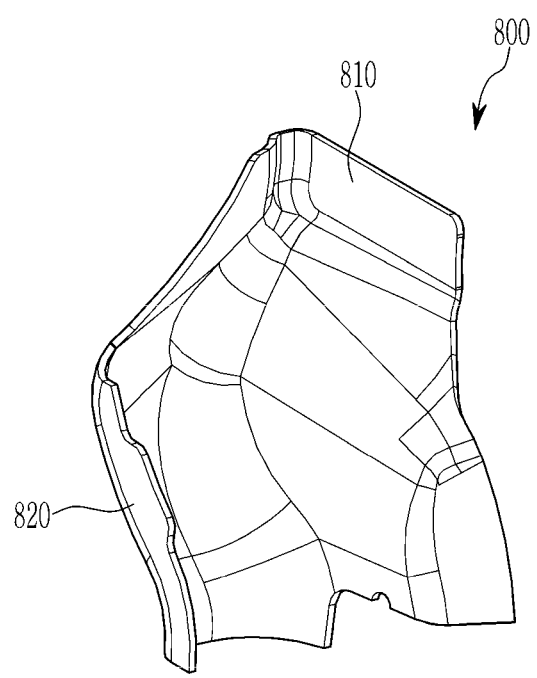

Referring to FIG. 11 and FIG. 12, the second guide mixer 800 may include a second guide body portion 810 mounted on the connection body 190, and a second guide extension portion 820 formed along a circumferential direction of the SDPF converter 300 from the second guide body portion 810. Alternatively, the second guide mixer 800 may be formed to extend by a set length along the circumference of the SDPF converter 300 between the SDPF converter 300 and the connection housing 200.

The second guide extension portion 820 may form a swirl-direction flow of the exhaust gas that flows from the LNT converter 100 to the SDPF converter 300 through the connection housing 200.

Figure 13:
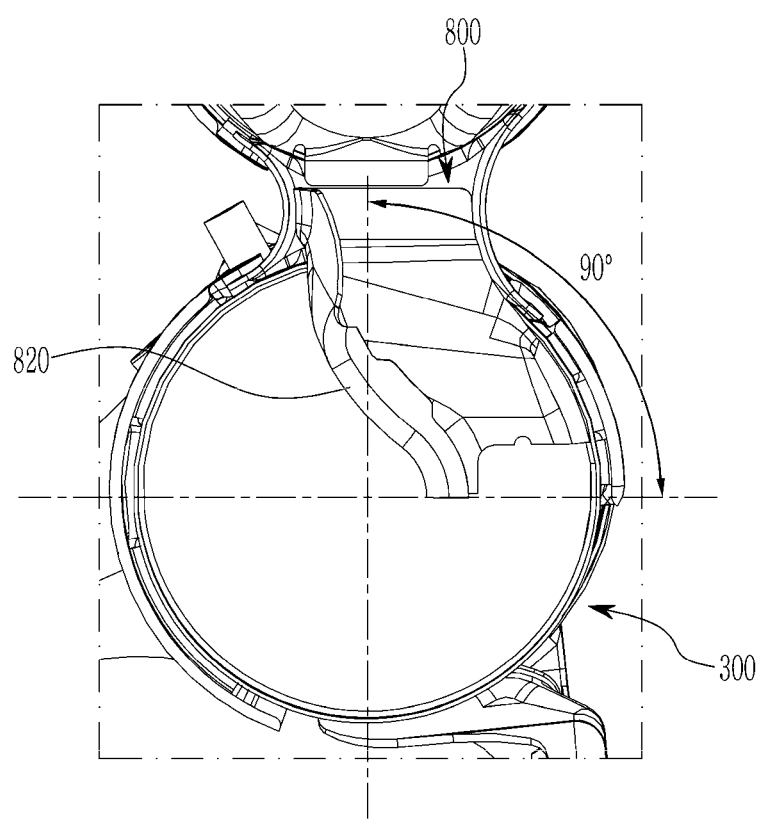
FIG. 13 is a plan view exemplarily illustrating a partial configuration of the catalytic converter according to the exemplary embodiment of the present disclosure.

Based on a length of the second guide extension portion 820, a magnitude of the swirl-direction flow of the exhaust gas and the reducing agent may be adjusted. To ensure a sufficient flow uniformity in the mixing chamber of the connection housing 200, the second guide extension portion 820 may be formed to have a length of 25% or more of a diameter of the SDPF converter 300 (e.g., 90 degrees in the circumferential direction of the SDPF converter) (see FIG. 13).

Hereinafter, the flow of the exhaust gas flowing inside the catalytic converter of the vehicle according to the exemplary embodiment of the present disclosure as described above will be described in detail with reference to the accompanying drawings.

FIG. 14, FIG. 15, FIG. 16 and FIG. 17 are views for explaining a flow of exhaust gas inside the catalytic converter according to the exemplary embodiment of the present disclosure.

Figure 14:
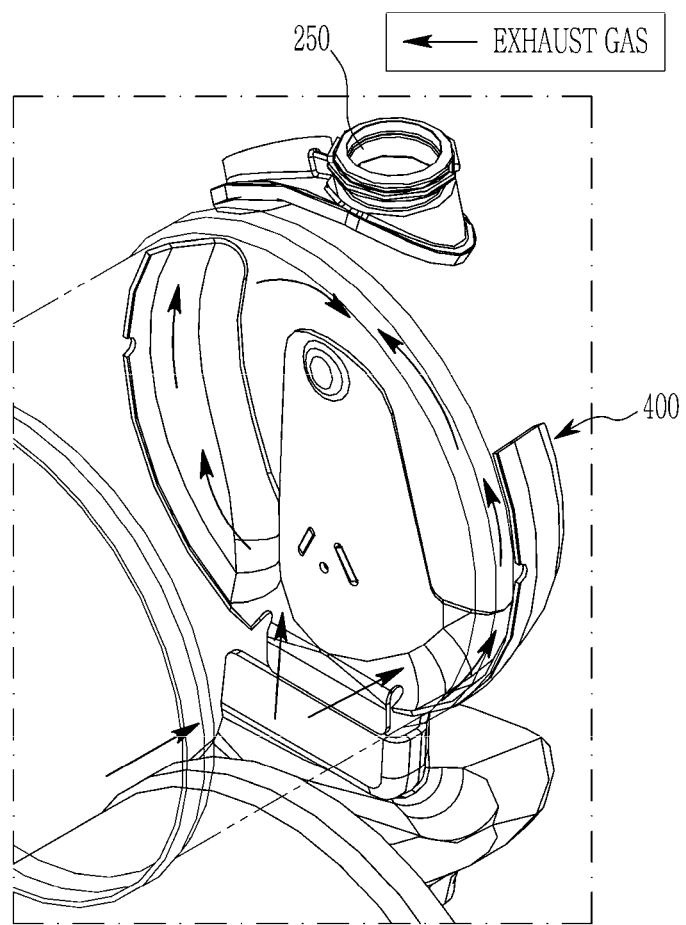
FIG. 14, FIG. 15, FIG. 16 and FIG. 17 are views for explaining a flow of exhaust gas inside the catalytic converter according to the exemplary embodiment of the present disclosure.
Figure 15:
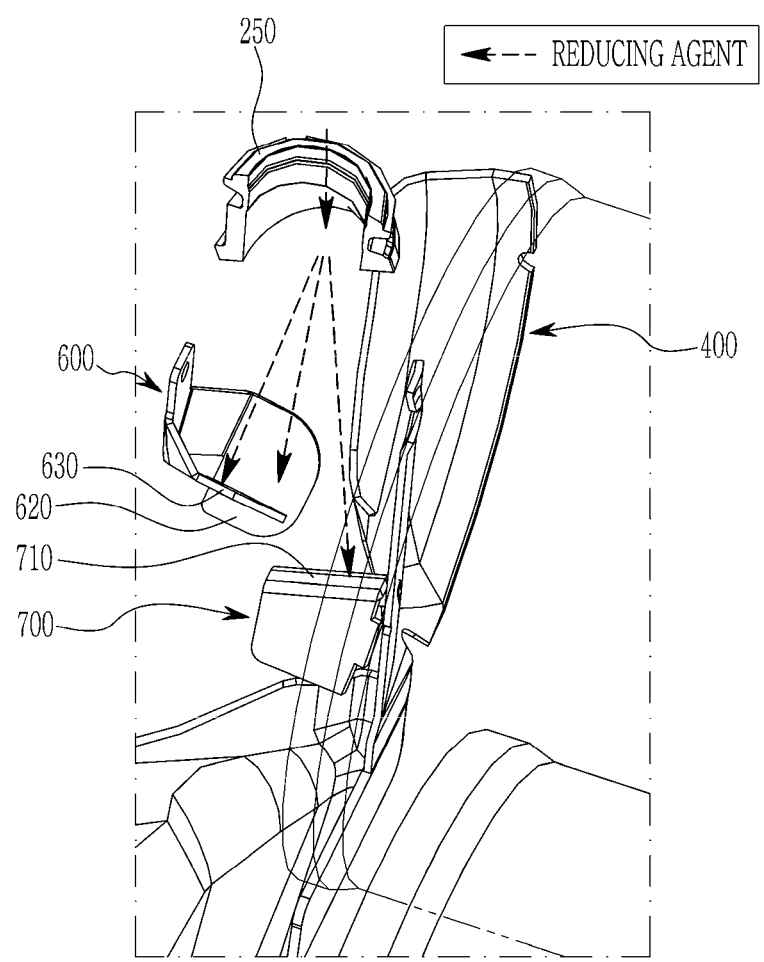
Figure 16:
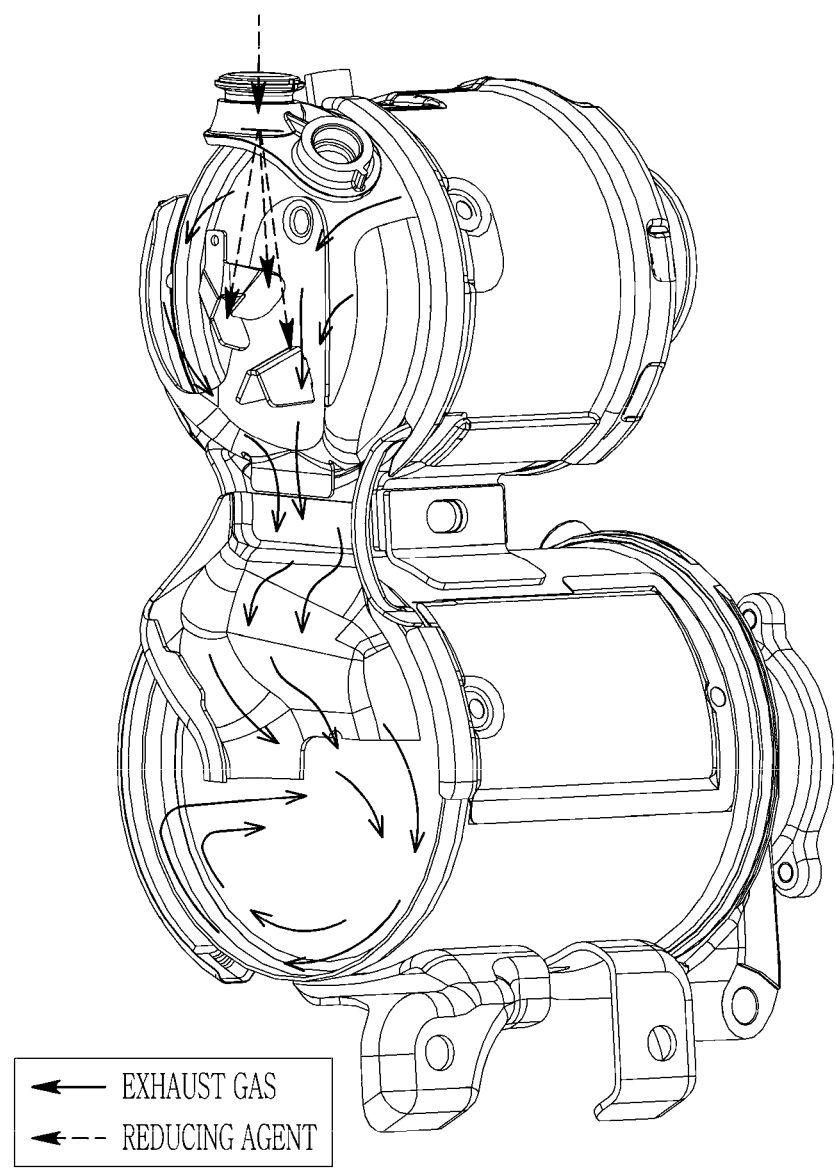
Figure 17:
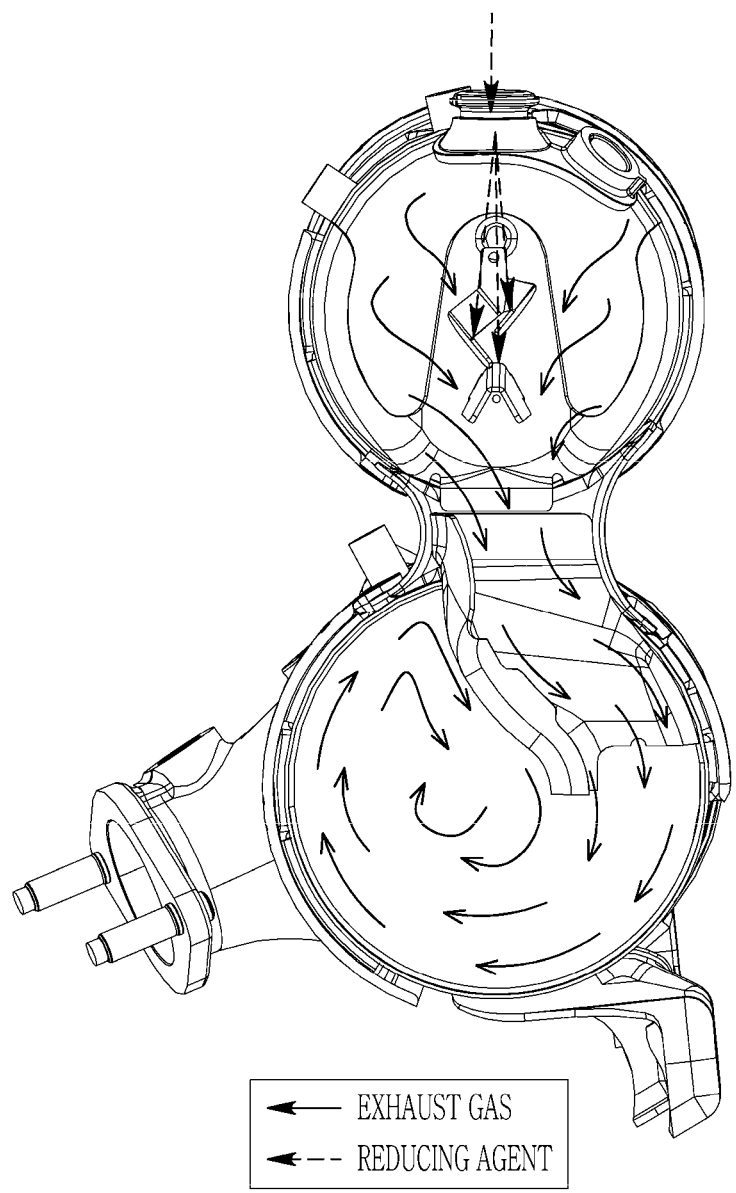

Referring to FIG. 14, and FIG. 15, exhaust gas discharged from an engine is introduced through the LNT inlet 114, and discharged through the LNT outlet 115 after passing through the LNT catalyst 140.

While the exhaust gas passes through the LNT catalyst 140, the LNT catalyst 140 absorbs nitrogen oxides (NOx) contained in the exhaust gas in an atmosphere where an air-fuel ratio is lean, and desorbs the absorbed nitrogen oxides and reduces the nitrogen oxides contained in the exhaust gas or the desorbed nitrogen oxides in an atmosphere where an air-fuel ratio is rich. Furthermore, the LNT catalyst 140 oxidizes carbon monoxides (CO) and hydrocarbons (HC) contained in the exhaust gas.

Herein, it should be noted that the hydrocarbons refer to all compounds including carbon and hydrogen, if they are contained in exhaust gas and fuel.

The exhaust gas passing through the LNT converter 100 flows in a direction from the LNT converter 100 toward the SDPF converter 300 inside the connection housing 200.

Some of the exhaust gas discharged from the LNT converter 100 moves toward the LNT cover 210 of the connection housing 200 by colliding with a lower end portion of the first guide body portion 410 of the first guide mixer 400.

The remainder of the exhaust gas discharged from the LNT converter 100 moves toward the LNT cover 210 of the connection housing 200 by flowing along lower end portions of the first guide left extension portion 420 and the first guide right extension portion 430 of the first guide mixer 400.

That is, while the exhaust gas flows along the lower end portions of the first guide left extension portion 420 and the first guide right extension portion 430 of the first guide mixer 400, a swirl-direction flow of the exhaust gas occurs between the LNT converter 100 and the LNT cover 210 of the connection housing 200.

At the present time, a reducing agent (e.g., urea solution) is injected toward the exhaust gas through the injection module 250 mounted on the connection housing 200. The injection module 250 may inject the reducing agent in three directions toward the SDPF cover from the LNT cover 210.

The reducing agent injected in one direction (e.g., a left direction) from the injection module 250 is atomized and vaporized by colliding with the first left wall 620 of the first impactor 600, the reducing agent injected in another direction (e.g., a right direction) is atomized and vaporized by colliding with the first right wall of the first impactor 600, and the reducing agent injected in another direction (e.g., a middle direction) is atomized and vaporized by colliding with the central wall of the second impactor 700.

The reducing agent atomized and vaporized by the first impactor 600 and the second impactor 700 is mixed with the exhaust gas, and the exhaust gas mixed with the reducing agent moves between the connection housing 200 and the connection body 190.

The second guide mixer 800 forms a stronger swirl-direction flow of the exhaust gas mixed with the reducing agent.

While the exhaust gas mixed with the reducing agent flows along the second guide extension portion 820 of the second guide mixer 800, a stronger swirl-direction flow of the exhaust gas mixed with the reducing agent is formed between the SDPF converter 300 and the SDPF cover 230 of the connection housing 200.

The exhaust gas mixed with the reducing agent is introduced into the SDPF converter 300. While the exhaust gas passes through the SDPF catalyst 340 in the SDPF converter 300, particulate matters contained in the exhaust gas are captured and nitrogen oxides contained in the exhaust gas are reduced by the SCR catalyst.

In the catalytic converter according to the exemplary embodiment of the present disclosure as described above, a swirl-direction flow of the exhaust gas is primarily formed by the first guide mixer 400.

The reducing agent atomized and vaporized by the first impactor 600 and the second impactor 700 is mixed with the exhaust gas, and a swirl-direction flow of the exhaust gas mixed with the reducing agent is secondarily by the second guide mixer 800.

By forming the strong swirl-direction flow of the exhaust gas using the first guide mixer 400 and the second guide mixer 800 as described above, it is possible to increase a flow uniformity index of the reducing agent. The increase in flow uniformity index of the reducing agent results in an increase in amount of ammonia absorbed into the SDPF catalyst 340, improving efficiency in purifying nitrogen oxides.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A catalytic converter apparatus of a vehicle, the catalytic converter apparatus comprising:
    a lean NOx trap (LNT) converter including an LNT catalyst to reduce nitrogen oxides contained in exhaust gas of the vehicle;
    an SDPF converter including an SDPF catalyst to capture particulate matters contained in the exhaust gas and reduce the nitrogen oxides contained in the exhaust gas using a reducing agent;
    a connection housing connecting the LNT converter and the SDPF converter to each other;
    an injection module provided in the connection housing to inject the reducing agent from the LNT converter toward the SDPF converter;
    an impactor provided inside the connection housing to atomize and vaporize the reducing agent injected from the injection module;
    a first guide mixer provided inside the connection housing to form a swirl-direction flow of the exhaust gas mixed with the reducing agent atomized through the impactor; and
    a second guide mixer provided downstream of the first guide mixer inside the connection housing to form an additional swirl-direction flow of the exhaust gas mixed with the reducing agent,
    wherein the injection module is mounted on the connection housing to inject the reducing agent in three directions toward the SDPF converter from the LNT converter,
    wherein the impactor includes:
        a first impactor disposed downstream of the first guide mixer to atomize and vaporize the reducing agent injected in two directions from the injection module among the three directions; and
        a second impactor disposed downstream of the first impactor to atomize and vaporize the reducing agent injected in one direction from the injection module among the three directions, and wherein the first impactor includes:
    a first fixing portion fixed to a lower surface of the connection housing above the LNT converter;
    a first left wall formed from the first fixing portion so that the reducing agent injected in one direction from the injection module collides therewith; and
    a first right wall formed from the first fixing portion so that the reducing agent injected in another direction from the injection module collides therewith.

2. The catalytic converter apparatus of claim 1, wherein the exhaust gas introduced into the SDPF converter from the connection housing flows from a right side to a left side inside the SDPF converter so that the exhaust gas inside the LNT converter flows in an opposite direction to the exhaust gas inside the SDPF converter.

3. The catalytic converter apparatus of claim 1, wherein the first guide mixer includes:
    a first guide body portion extending in a direction from the SDPF converter toward the LNT converter;
    a first guide left extension portion extending along a first-side internal circumference of an upper portion of the LNT converter from a first end portion of the first guide body portion; and
    a first guide right extension portion extending along a second-side internal circumference of the upper portion of the LNT converter from a second end portion of the first guide body portion.

4. The catalytic converter apparatus of claim 3, wherein the first guide body portion is concavely formed downward from the upper portion of the LNT converter.

5. The catalytic converter apparatus of claim 3, wherein the first guide left extension portion and the first guide right extension portion are concavely formed to cover an edge portion of the LNT catalyst of the LNT converter.

6. The catalytic converter apparatus of claim 3, wherein a distance between an upper surface of the LNT catalyst of the LNT converter and a lowermost end portion of the first guide mixer is 50% or more than 50% of a diameter of the LNT catalyst of the LNT converter.

7. The catalytic converter apparatus of claim 1, wherein the second impactor includes a second central wall with which the reducing agent injected in another direction from the injection module collides.

8. The catalytic converter apparatus of claim 7, wherein a pair of second central bent portions bent left and right from the second central wall, respectively, are formed from the second central wall.

9. The catalytic converter apparatus of claim 8, wherein each of the second central bent portions has a protrusion, and the protrusion is inserted into a slot formed in the first guide mixer.

10. The catalytic converter apparatus of claim 1, wherein the second guide mixer is formed to extend by a set length along a circumference of the SDPF converter between the SDPF converter and the connection housing.

11. The catalytic converter apparatus of claim 10, wherein the second guide mixer includes a second guide body portion mounted on a connection body, and a second guide extension portion formed along a circumferential direction of the SDPF converter from the second guide body portion.

12. The catalytic converter apparatus of claim 11, wherein the second guide extension portion is formed to have a length of 25% or more than 25% of a diameter of the SDPF converter.

* * * * *